United States Patent
Reddick et al.

(10) Patent No.: US 11,887,506 B2
(45) Date of Patent: Jan. 30, 2024

(54) USING A GLICKO-BASED ALGORITHM TO MEASURE IN-COURSE LEARNING

(71) Applicant: COURSERA, INC., Mountain View, CA (US)

(72) Inventors: Rachel Reddick, Sunnyvale, CA (US); Emily Glassberg Sands, Menlo Park, CA (US); Vinod Bakthavachalam, San Francisco, CA (US); Alan Hickey, Palo Alto, CA (US)

(73) Assignee: Coursera, Inc., Mountain View, CA (US)

( * ) Notice: Subject to any disclaimer, the term of this patent is extended or adjusted under 35 U.S.C. 154(b) by 41 days.

(21) Appl. No.: 16/750,626

(22) Filed: Jan. 23, 2020

(65) Prior Publication Data

US 2020/0342777 A1   Oct. 29, 2020

Related U.S. Application Data

(60) Provisional application No. 62/837,449, filed on Apr. 23, 2019.

(51) Int. Cl.
| | | |
|---|---|---|
| *G09B 7/04* | (2006.01) | |
| *G06Q 50/20* | (2012.01) | |
| *G09B 5/12* | (2006.01) | |

(52) U.S. Cl.
CPC .............. *G09B 7/04* (2013.01); *G06Q 50/20* (2013.01); *G09B 5/12* (2013.01)

(58) Field of Classification Search
CPC ............. G09B 7/04; G09B 5/12; G06Q 50/20
USPC ........................................................ 434/362
See application file for complete search history.

(56) References Cited

U.S. PATENT DOCUMENTS

| | | | | |
|---|---|---|---|---|
| 8,545,232 | B1 * | 10/2013 | Bardige | G09B 7/08 |
| | | | | 434/322 |
| 10,043,410 | B1 * | 8/2018 | Swank | G09B 5/065 |
| 10,679,512 | B1 * | 6/2020 | Yang | G09B 7/02 |
| 2014/0322694 | A1 * | 10/2014 | Kolla | G09B 5/08 |
| | | | | 434/362 |

(Continued)

OTHER PUBLICATIONS

Kevin Fan; "Using a rating system as an underlying item response theory model for EdQu's computerized adaptive testing system"; 2016; http://www.diva-portal.org/smash/get/diva2:940690/FULLTEXT01.pdf (Year: 2016).*

(Continued)

*Primary Examiner* — Kesha Frisby
(74) *Attorney, Agent, or Firm* — Brake Hughes Bellermann LLP

(57) ABSTRACT

Techniques are described by which learner skill can be estimated over time, even in the presence of large data sets. A rating system can be used in which a learner's submission of a course assessment can be interpreted as a single match, where the learner and the course assessment are competing against each other. This approach can be applied to online learning platforms that include very many learners who have submitted assignments very many times in many courses. The described techniques provide reliable estimates of assessment difficulty and learner ability. The described scoring framework may be used as a basis for various applications that account for a learner's ability, such as adaptive diagnostic tests and personalized recommendations.

20 Claims, 9 Drawing Sheets

(56) References Cited

U.S. PATENT DOCUMENTS

| | | | |
|---|---|---|---|
| 2016/0217701 A1* | 7/2016 | Brown | G09B 7/00 |
| 2016/0293036 A1* | 10/2016 | Niemi | G09B 7/04 |
| 2017/0178531 A1* | 6/2017 | Swank | G09B 7/08 |
| 2017/0372215 A1* | 12/2017 | Platt | G06F 16/245 |
| 2018/0330629 A1* | 11/2018 | Raman | G06F 16/168 |
| 2020/0065697 A1* | 2/2020 | Watson | G06Q 10/06393 |
| 2021/0201690 A1* | 7/2021 | Keat | G09B 7/00 |

OTHER PUBLICATIONS

Anurag Sarkar; "Level Difficulty and Player Skill Prediction in Human Computation Games"; 2017; https://www.aaai.org/ocs/index.php/AIIDE/AIIDE17/paper/viewFile/15851/15203 (Year: 2017).*

Mark Glickman; "Example of the Glicko-2 system"; http://www.glicko.net/glicko/glicko2.pdf; 2013 (Year: 2013).*

H. T. Binh et al.: "Student ability estimation based on IRT," 2016 3rd National Foundation for Science and Technology Development Conference on Information and Computer Science, pp. 57-62, 2016.

A. Corbett et al.: "Knowledge Tracing: Modeling the Acquisition of Procedural Knowledge," User Modeling and User-Adapted Interaction, 4:253-278, 1994.

M. E. Glickman: "Parameter estimation in large dynamic paired comparison experiments," Appl. Statist., 48:377-394, 1999.

H. Goldowsky: "A Conversation with Mark Glickman," Chess Life Magazine, 9 pages, Oct. 2006.

J. Gonzalez-Brenes et al.: "General Features in Knowledge Tracing: Applications to Multiple Subskills, Temporal Item Response Theory, and Expert Knowledge," Proceedings of the 7th International Conference on Educational Data Mining, pp. 84-91, 2014.

P. Pavlik et al.: "Performance Factors Analysis—A New Alternative to Knowledge Tracing," In Proc. of Artificial Intelligence in Education. IOS Press, 8 pages, 2009.

R. Pelanek: "Applications of the Elo Rating System in Adaptive Educational Systems," Computers and Education, 16 pages, Mar. 24, 2016.

E. G. Sands: "How our Skills Graph is helping learners find the right content to reach their goals", Medium Post, https://medium.com/coursera-engineering/courseras-skills-graph-helps-learners-find-the-right-content-to-reach-their-goals-b10418a05214, 5 pages, Jul. 2018.

N. Silver: "Our NBA Player Projections Are Ready for 2018-19," FiveThirtyEight, https://fivethirtyeight.com/features/our-nba-player-projections-are-ready-for-2018-19/, 22 pages, Jun. 26, 2018.

International Chess Federation: "FIDE Handbook—B. Permanent Commissions / 02. FIDE Rating Regulations (Qualification Commission) / FIDE Rating Regulations effective from Jul. 1, 2017 /", https://handbook.fide.com/chapter/B022017, 7 pages, Jul. 1, 2017.

* cited by examiner

← 302

| Skill | Number of Attempts | Number of Courses |
|---|---|---|
| Statistical Programming | 17,840,101 | 157 |
| Machine Learning | 13,452,639 | 60 |
| Computer Programming | 12,940,557 | 383 |
| Software Engineering | 9,287,216 | 245 |
| Artificial Intelligence | 7,900,817 | 127 |
| Management | 6,104,244 | 386 |

FIG. 3

USING A GLICKO-BASED ALGORITHM TO MEASURE IN-COURSE LEARNING

CROSS-REFERENCE TO RELATED APPLICATIONS

This application claims the benefit of U.S. Application No. 62/837,449 filed on Apr. 23, 2019, entitled "Using a Glicko-Based Algorithm to Measure In-Course Learning" and which is incorporated by reference in its entirety herein.

TECHNICAL FIELD

This description relates to quantification of learner and content ratings for online learning systems.

BACKGROUND

Providers of online learning may provide a large number of courses to millions of learners across the world. Such learners may vary greatly in characteristics such as ability, experience, and context. Moreover, such learner characteristics may change over time, including changes that occur as a result of learners progressing through the online courses themselves.

Online learning enables the providers to capture and store large amounts of learner data and course data, including historical performances of learners with respect to various types of assessments that may be conducted. However, even when available, it is difficult to leverage such data into practical use, in a manner that furthers the objectives of an online learning provider, such as educating learners, as well as facilitating instructors and developers in providing course content.

For example, it is difficult to quantify a current ability of a learner with respect to particular course content. Although techniques exist which attempt to do so, such techniques are not practical in the context of large-scale online learning platforms. For example, such conventional techniques may be inaccurate, or may require excessive time and/or resources to calculate results.

SUMMARY

According to general aspects, an assessment rating may be assigned to an assessment corresponding to a skill. The assessment may be administered to a plurality of learners using an online learning platform to assign each learner of the plurality of learners a corresponding assessment score that indicates either passing or failing the assessment. A first execution of a ratings algorithm may be executed to assign a learner skill rating to each learner of the plurality of learners with respect to the skill, based on the assessment rating and the corresponding assessment score, and to assign an updated assessment rating to the assessment. The rating algorithm may define each assessment administration as a match between the assessment and the corresponding learner that is won by the learner when the assessment score is passing and won by the assessment when the assessment score is failing. A second execution of the ratings algorithm may be executed, in which the updated assessment rating is held fixed to assign an updated learner skill rating to each learner of the plurality of learners with respect to the skill.

The details of one or more implementations are set forth in the accompanying drawings and the description below. Other features will be apparent from the description and drawings, and from the claims.

BRIEF DESCRIPTION OF THE DRAWINGS

FIG. 3 is a table illustrating example skill data.

DETAILED DESCRIPTION

A challenge in the field of measuring ability in the context of on-line learning is measuring the current ability of learners while they are learning. Many forms of inference become computationally complex in the presence of time-dependent learner ability, and are not feasible to implement in an online context.

An approach is described herein by which learner skill can be estimated over time even in the presence of large data sets. A rating system can be used, where the rating system can be related to a rating system used in chess and sports tournaments, and in which a learner's submission of a course assessment can be interpreted as a single match, e.g., equivalent to a rating period of one match per tournament in the Glicko context, as described below. This approach can be applied to online learning platforms that include very many learners (e.g., millions of learners) who have submitted assignments very many times (e.g., tens of millions of times) in many courses. The described techniques provide reliable estimates of assessment difficulty and learner ability. The described scoring framework may be used as a basis for various applications that account for a learner's ability, such as adaptive diagnostic tests and personalized recommendations.

Figure 1:
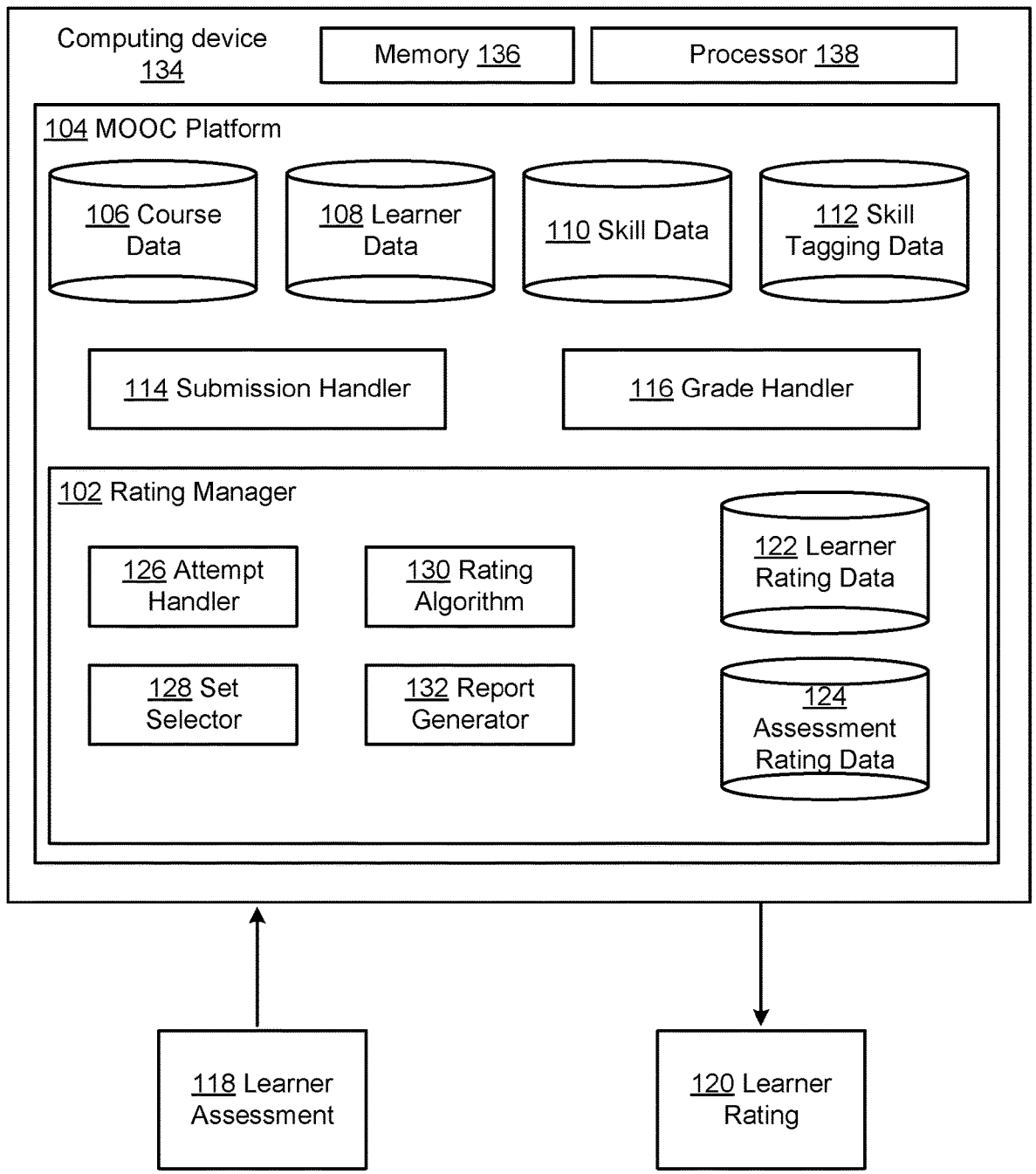
FIG. 1 is a block diagram of a system for rating in-course learning of a learner.

FIG. 1 is a block diagram of a system for rating in-course learning of a learner. In FIG. 1, a rating manager 102 is a component of a Massive Open Online Course (MOOC) Platform. As described in detail, below, the rating manager 102 is configured to provide skill-specific learner scores to individual learners, even when the MOOC platform 104 services millions of learners. As also described, the rating manager 102 is configured to adapt and update these learner scores over time, and in response to new learning on the part of the millions of learners.

In the example of FIG. 1, the MOOC platform 104 represents virtually any online system for administering online courses. It will be appreciated that the MOOC platform 104 may include many different aspects that are not described here in detail, except as may be necessary or helpful in understanding the operations of the rating manager 102. For example, various aspects of the MOOC platform 104, such as techniques for learner onboarding, content management, interfaces with third-party (e.g., university) systems, course or degree progress tracking, data security, and many other aspects are not described herein, but would be understood to be included by one of skill in the art.

For purposes of describing the rating manager 102, the MOOC platform 104 is illustrated as including course data 106, learner data 108, skill data 110, and skill tagging data 112. For example, the course data 106 may include course content related to courses offered by the MOOC platform 104, such as machine learning, computer programming, math, science, history, or any type of course content. The course content may be passive or interactive, and may include text, video, audio, or other content. The course data 106 also may include course-related content such as course descriptions, tests and other assignments, and relationships between courses that may be taken together in pursuit of a degree or certificate.

As described in detail, below, the course data 106 may include various types of assessment data or content. Such assessments are intended to measure a learner's progress or ability with respect to each course, and may include various types of tests (e.g., multiple choice, or essay), or other types of assignments that may be given to learners, such as the writing of a computer program.

The learner data 108 may include learner profile information, as well as historical information of each learner's previously-completed coursework. The learner data 108 may include learners' goals, as well as current status information with respect to individual courses in progress. As described herein, learner ratings determined by the rating manager 102 also may be included in the learner data 108.

The skill data 110 refers to individual skills that may have a many-to-many relationship with either courses and/or assessments in the course data 106, where these relationships are illustrated as being stored using the separate skill tagging data 112. For example, a particular calculus skill may be associated with multiple math classes, as well as multiple physics classes. A machine learning skill may also be relevant to multiple courses.

Thus, multiple skills may be tagged as being associated with multiple courses, and vice-versa. Additionally, one or more skills may be tagged to one or more individual assessments within an individual course. For example, a course may teach multiple skills, yet the assessments of that course may not address all of the courses skills.

In traditional learning environments, a student may progress through courses towards a degree, but completion of a course does not ensure, or quantify an extent of, mastery of individual skills associated with each course. Moreover, when a learner considers a new course, or type of course, it is desirable to begin such new coursework at a level that is appropriate for that learner (i.e., neither remedial nor overly advanced).

In FIG. 1, by enumerating skills within the skills data 110 and then tagging the enumerated skills to courses and/or assessments within the skill tagging data 112, the MOOC platform 104 provides flexible, quantifiable skill tracking on a learner-by-learner basis. For example, as courses change, or as new courses are added, relationships between such courses and relevant skills may be updated, as well. Conversely, a new skill may be added, and linked to corresponding, relevant courses or assessments.

The rating manager 102 is configured to provide skill-specific scores or ratings for individual learners. The resulting learner ratings may be shared with the individual learners, so that the individual learners may assess their current ability level with respect to a particular skill, as well as their progress over time.

The learner ratings may also be used internally by the MOOC platform 104, without necessarily being shared with the learners. For example, when a learner registers for a new course, the MOOC platform 104 can select coursework that is suitable for that learner (e.g., may skip or omit course portions teaching a skill for which the learner already meets a threshold score).

In order to assign a skill-specific learner rating, the rating manager 102 is configured to also rate a difficulty level of assessments provided to the learners. Otherwise, for example, a learner who achieves high scores on easy assessments may be in danger of being rated too highly, while a learner receiving low scores on difficult assessments may be provided an overly-low rating for a corresponding skill(s).

Therefore, as described, the rating manager 102 is configured to provide assessment ratings, as well as learner ratings. For example, a test may comprise multiple choice questions, or problems/proofs to be solved. Each question or problem may have a level of difficulty, and each test as a whole may have a level of difficulty.

It is possible for instructors or other experts to attempt to rate a difficulty level of a test question, test, or other assessment. However, it is difficult, burdensome, inaccurate, and infeasible to attempt to assign assessment ratings in this manner for the MOOC platform 104. For example, a number of assessments may be very large, and the content of the assessments may be changed over time.

Even if individual instructors attempted to provide assessment ratings, such ratings may be too broad (e.g., at a course level, rather than skill-level, and simply rating content as 'beginner,' 'intermediate,' 'advanced,'). Moreover, as instructors are experts in their fields, it may be challenging for them to accurately infer the extent of difficulty that may be experienced by various learners.

Such rough estimates are generally not enough to establish prerequisites or help a learner know if he or she is ready to start a course. Since the label is at the course level, skill-related nuance is lost. For example, a course may teach both intermediate statistics and introductory programming. These labels are also insufficient for a learner to determine whether it would be more valuable to the learner to jump in to a course halfway through, rather than start at the beginning. Therefore, it is useful to estimate content difficulty independent of instructor labels. Personalizing this support to individual learners requires estimating their degree of skill as well.

Thus, in general, a requirement of an adaptive learning system is the simultaneous understanding of learner skill and assessment difficulty. Such measurements also enable ordering content by measured difficulty and the recommendation of content and assessments appropriate for a learner's degree of skill, among other applications.

Some conventional approaches exist for obtaining skill estimates. For example, Item Response Theory, one common method for obtaining skill estimates in a testing context, assumes a fixed skill for the learner. While valid during a single exam, this assumption fails for learners who are continuing to learn while taking a course.

Some techniques can rigorously handle skills that change over time, such as knowledge tracing and performance factor analysis, but they are computationally intensive. For many large online datasets, applying these techniques would require computing results for millions of learners across thousands of courses. Further, because learners in an online platform can benefit from visibility into their own skills, online updates are desirable. Under these conditions, many approaches become computationally intractable.

Although alternatives such as Bayesian knowledge tracing have potential, the methods are difficult to scale up from a few tens of thousands of assessment attempts to over ten million for a single skill in the case of a MOOC platform. Further, learners with stronger skills tend to work on more challenging problems, which systematically underestimates the difficulty of advanced content, even in some knowledge tracing approaches.

The rating manager 102 in FIG. 1 implements a rating system in which each learner is considered to be in a competition or game with each assessment. In this paradigm, for example, each attempt by a learner at passing an assessment may be considered as a match. A learner may 'win' such a match by receiving a threshold grade (e.g., a passing grade) on the assessment, while the assessment may be considered to 'win' the match when the learner does not receive at least a threshold grade (e.g., fails the assessment).

Accordingly, the rating manager 102 may assign a rating, e.g., score, to each learner and each assessment. Advantageously, the learner and assessment ratings may both be on the same scale, so that the ratings enable meaningful comparisons among any combination of multiple learners, multiple assessments, or combinations of learner and assessments.

For example, the rating manager 102 may utilize a variation of the Elo rating system and/or related rating systems, which have been used in chess tournaments and for team ratings in many sports. To apply the Elo, and related, rating systems to analyze user skills, as referenced, learners and assessments may be treated as players in a tournament.

In more specific implementations, the rating manager 102 may utilize variations of the Glicko rating system, which is itself a variant of the Elo rating system. The Glicko rating system is known to incorporate uncertainty in its rating measurements, as described in detail, below.

In the Elo rating system, as referenced, the general principle is that every player has a score, which is updated after matches of a tournament (e.g., chess). In general, updates will be large if the outcome of a match is unexpected.

For example, if a novice player defeats a master, the novice's score will have a large increase and the master will have a large decrease. On the other hand, if a master defeats a novice, the updates for both will be small or negligible.

The rating manager 102 applies variations of this type of method to learners and assessments, where each learner and assessment is interpreted as a player. For example, a new learner who "defeats" a hard assessment in the Machine Learning skill will gain a large increase to that skill, but not lose much from their score if they fail. Since that ability differs from other skills (such as Management), a learner should have different scores for each possible skill. Assessments may also be associated with the relevant skills, e.g., vis-à-vis the skill tagging data 112.

The Glicko variant of the Elo rating system uses an approximated Bayesian framework, which, as referenced, incorporates uncertainty into the rating. This may be particularly helpful for understanding learners who have not yet completed very many assessments. It also supports estimation of ability across populations by enabling weighted averages based on the uncertainty. The Glicko scoring system has the drawback that it can not be easily adapted to use more complex Item Response Theory solutions, such as those for multiple choice questions with a non-zero success probability even in the case of very low skill.

However, the rating manager 102 generally utilizes full assessments, e.g., on a pass/fail basis. As a result, the assessments may contain virtually any type of assessment content, or combinations thereof. For example, an assessment may include a test with multiple choice questions, short answer questions, essay questions, mathematical solutions or proofs, or combinations thereof. An assessment also may include essays, computer programs or code, or virtually any other content that may be turned in for a graded assessment.

In FIG. 1, the MOOC platform 104 is illustrated as including a submission handler 114 and a grade handler 116. The submission handler 114 may be configured to receive any such assessments just referenced for associated processing thereof, while the grade handler 116 may be configured either to provide a grade automatically when feasible, or to interface with an instructor or other human grader to obtain a grade.

In FIG. 1, the submission handler 114 and a grade handler 116 are illustrated separately from the rating manager 102, and may be understood to be parts of the MOOC platform 104 that may have various functionalities not directly related to, but that are leveraged by, the rating manager 102. For example, both the submission handler 114 and the grade handler 116 may be configured to update course data 106 and learner data 108 to reflect receipt and grading of an assessment from a particular learner.

Thus, when a learner assessment 118 is received by the MOOC platform 104 as part of normal operations of the MOOC platform 104, an instance of the assessment handler 114 associated with a corresponding course being taken by the learner in question may receive the learner assessment 118, update the course data 106 and the learner data 108 to register completion thereof, and forward the assessment to the grade handler 116.

Once a grade is received, the assessment handler 114 may further update the course data 106 and the learner data 108 to reflect the grade. For example, the course data 106 may be updated to reflect a completion of the course in question, or a portion thereof.

The grade handler 116 may be further configured to provide the grade to the rating manager 102. The rating manager 102 may create or update a learner rating 120 for the learner in question, for one or more skills related to the assessment 118, as described in more detail, below. As also described, the learner rating 120 may be provided to the learner, and also may be used in various applications of the MOOC platform 104 to customize the learner's experience, without necessarily being provided to the learner.

As illustrated, the rating manager 102 may be configured to store both learner rating data 122 and assessment rating data 124. Both the learner rating data 122 and assessment rating data 124 may be updated over time, although, as described herein, the assessment rating for an individual assessment may be more likely to reach a steady state value than learner ratings for learners.

An attempt handler 126 may be configured to determine individual learner attempts, e.g., from the submission handler 114. For example, as described below, the attempt handler 126 may filter or omit some submissions for purposes of determining a learner rating. For example, such filtering may occur when an assessment is submitted multiple times due to technical errors by the MOOC platform 104, or because a learner is attempting to game the system to obtain an artificially high learner rating.

A set selector 128 is configured to select sets of assessments and corresponding learners for which associated ratings will be updated. For example, in the chess analogy used above, each skill of the MOOC platform 104 may be considered a different type of game for purposes of calculating a rating (e.g., a statistical programming skill, or a machine learning skill). The set selector 128 may receive large pluralities of attempts from large pluralities of learners, and the attempts may each be associated with one or more skills. Therefore, the set selector 128 may be configured to define sets of learners and attempts which correspond to individual skills for which ratings may be updated.

Additionally, the set selector 128 may select sets of learners and/or assessments over two or more periods of time, so as to execute versions of a multi-pass approach to calculating ratings. The multi-pass approach reflects the fact that assessment ratings, although initially unknown, are more likely to reach a steady state or substantially static value than learner ratings.

Therefore, for example, a first pass of a rating algorithm 130 may be executed to assign learner ratings to a plurality of learners and corresponding assessments. For example, in the first pass, assessment ratings may be set to a default or estimated value. In the first pass, both the learner ratings and assessment ratings may be updated.

In many cases, the assessment ratings will be relatively stable and static, as compared to the learner ratings. That is, learner ratings are expected to increase as learners progress, or perhaps to decline if the learners spend time away from relevant coursework. However, assessment ratings may stay relatively constant across many different learners and time periods.

Moreover, the assessment ratings may reach their stable values during the first pass of the rating algorithm 130, even when the learner ratings updated during the first pass do not (e.g., due to initial inaccuracy of the assessment ratings). In some cases, a particular assessment rating may not reach a stable value (e.g., may not reach a convergence criteria), and such assessment ratings may be omitted, and/or may be further updated at a later time.

In general, once the first pass has been executed, a second pass of the rating algorithm 130 may be executed at a later time. The second pass may include the same plurality of learners, or a subset thereof, and also may include a second plurality of learners. For example, the original or first plurality of learners may take the assessments when a course or assessment is first released, and the second plurality of learners may take the assessments at a later time.

During the second pass of the rating algorithm, the assessment rankings may be held stable at the values calculated during the first pass, while learner ratings may be updated for the first plurality (and second plurality, if any) of learners. In this way, the ratings of the first plurality of learners may be updated to be more accurate, even when the first plurality of learners has not submitted any additional assessments. Moreover, the assessment ratings may be more likely to quickly reach an accurate, steady state value. Further details and examples of the multi-pass approach are illustrated and described below, e.g., with respect to FIG. 2.

A report generator 132 may be configured to provide desired notifications of learner rating data 122 and/or assessment rating data 124. As shown in FIG. 1, the learner rating 120 may be made available to each learner. As also described herein, the report generator 132 may be configured to interface with other portions of the MOOC framework 104 and related applications, so as to further refine and customize learner experiences and available courses, and to offer new and additional features that may not otherwise be feasible.

In FIG. 1, the MOOC platform 104 is illustrated as being implemented using at least one computing device 134, using at least one non-transitory computer readable storage medium illustrated as memory 136, and at least one processor 138. That is, the at least one processor 138 may execute instructions stored using the memory 136 to provide the MOOC platform 104.

Of course, FIG. 1 is a simplified example, and should be understood to represent and include many distributed instances of the MOOC platform 104, and aspects thereof. For example, the MOOC platform 104 may represent a world-wide distribution of networked servers that are available to serve learners. Accordingly, although the various elements and modules of FIG. 1 are illustrated as discrete components, it will be appreciated that such elements and modules may be implemented using sub-elements and sub-modules, which may be distributed for use in the manner(s) just referenced.

Figure 2:
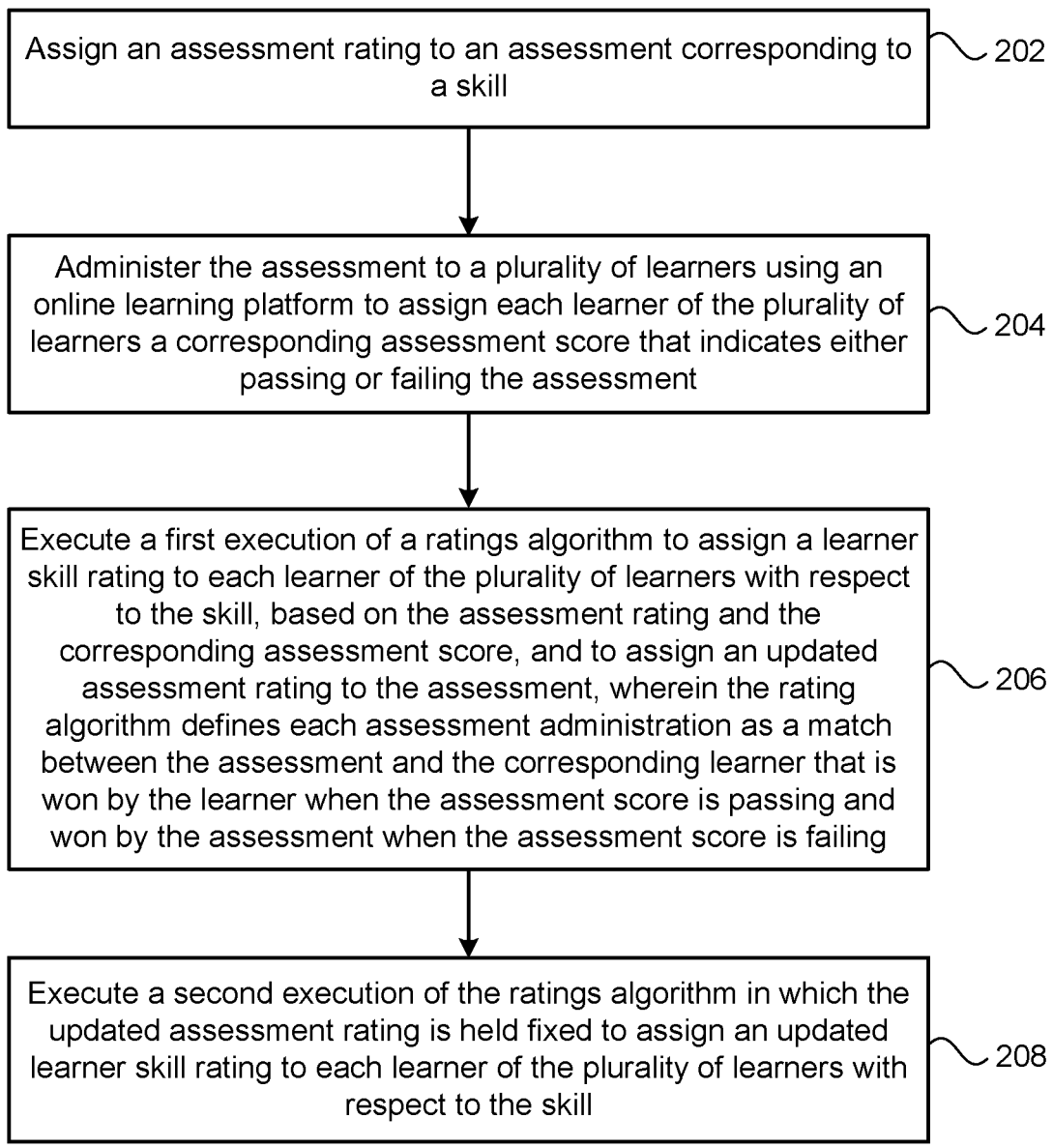
FIG. 2 is a flowchart illustrating example operations of the system of FIG. 1.

FIG. 2 is a flowchart illustrating example implementations of the system of FIG. 1. In the example of FIG. 2, operations 202-208 are illustrated as separate, sequential operations. However, in various implementations, the operations may include sub-operations, or may be combined, or may include additional or alternative operations. Additionally, such operations and sub-operations may be performed in an iterative, looped, or branched fashion.

In the example of FIG. 2, an assessment rating may be assigned to an assessment corresponding to a skill (202). For example, one or more assessments stored in course data 106 may have initial assessment rating(s) assigned and stored using the assessment rating data 124. For example, a test comprising multiple questions may be assigned an assessment rating.

In more particular examples, a new assessment, e.g., test, may not have an assessment rating, and may initially be assigned a default or estimated assessment rating. For example, a new test may simply be assigned a rating of zero, or may be assigned a default value based on an instructor's estimate of difficulty.

In settings such as chess or other games, Elo or Glicko type rating algorithms assume that all participants are persons, and, although rating scores may vary widely between novices and experts, the ways that the ratings change over time will be similar for all participants. For example, either a novice or an expert who does not play for an extended period will typically see his or her rating decrease. Also, both novices and experts will tend to see rating score increases when playing matches frequently, although the expert will tend to see less of a rate of increase.

In contrast, in the system of FIG. 1 and as referenced above, an assessment will tend to have a much more static rating than a learner. That is, the assessment may be considered to have an objective value over a period of time that is long compared to the time periods that courses are administered by the MOOC platform 104. On the other hand, as referenced above, a value of this rating is not known a priori.

The assessment may be administered to a plurality of learners using an online learning platform to assign each learner of the plurality of learners a corresponding assessment score that indicates either passing or failing the assessment (204). For example, the MOOC platform 104 may be used to administer the assessment to a plurality of learners at a first point in time. For example, for a new course or a new assessment, an administration of the assessment may be the first administration.

In FIG. 1, submissions of the assessment 118 may be received by the submission handler 114 and a passing or failing grade may be assigned by the grade handler 116. The attempt handler 126 may determine that the assessment 118 should be considered an attempt for purposes of executing the rating algorithm 130. The set selector 128 may determine that the administration of the assessment to the plurality of students should be defined as a set with respect to the skill, based on the skill tagging data 112.

Then, a first execution of a ratings algorithm to assign a learner skill rating to each learner of the plurality of learners with respect to the skill, based on the assessment rating and the corresponding assessment score, and to assign an updated assessment rating to the assessment, wherein the rating algorithm defines each assessment administration as a match between the assessment and the corresponding learner that is won by the learner when the assessment score is passing and won by the assessment when the assessment score is failing (206). For example, as referenced above and described in more detail, below, the rating algorithm 130 may be based on the Elo or the Glicko algorithm, modified for use in the context of the MOOC platform 104.

In the example, it will be appreciated that this first or initial pass or application of the rating algorithm 130 will be likely to provide inaccurate learner ratings, due to the initially unknown, inaccurate, and/or estimated assessment rating. For example, if the assessment is assigned an initial rating of 0, then learners passing the assessment may not be sufficiently rewarded with a corresponding increase in their learner ratings, while learners who fail the assessment may have their learner ratings reduced excessively. Nonetheless, the assessment rating will also be updated by way of execution of the rating algorithm, and will subsequently be more accurate.

A second execution of the ratings algorithm may be executed in which the updated assessment rating is held fixed to assign an updated learner skill rating to each learner of the plurality of learners with respect to the skill (208). In this way, accurate ratings for both learners and assessments may be obtained quickly and efficiently.

In some cases, the second execution of the ratings algorithm 130 may occur with respect to a second plurality of learners, in addition to, or inclusive of, the earlier or first plurality of learners. For example, a first plurality of learners may submit the assessment when a corresponding course is initially released by the MOOC platform 104, and a second plurality of learners may take and submit the assessment at a later time. In the normal course, the second plurality of learners would also receive an assessment score (e.g., a grade by way of the grade handler 116).

Then, the second execution of the ratings algorithm may be executed to assign an updated learner skill rating to each learner of the first plurality of learners and to assign a learner skill rating to each learner of the second plurality of learners with respect to the skill, while holding the assessment rating fixed.

In these examples, by executing the rating algorithm 130 again, the original group (first plurality) of learners may have their learner ratings (e.g., stored using the learner rating data 122) updated and made more accurate, even when those learners have not taken any further action (e.g., assessment) with respect to the relevant course or skill.

By executing two passes of the ratings algorithm 130, the system of FIG. 1 provides fairness and consistency to all learners. For example, a learner who took an assessment a year ago will be provided with the same result as if taking the assessment currently. The first pass itself, while running, updates the learner and assessment ratings going forward in time. Thus, in the first pass, a learner taking an assessment earlier is competing against an assessment rating that is different from later on. In the second pass, the assessment scores may be held fixed, so that each learner taking the same assessment is measured against the same standard. The second pass generically includes all learners from the first pass, but may include additional learners, as referenced. The first pass must be executed as a batch process offline, or as incremental updates to a previous batch process. The second pass may be executed fully or partially online.

In this way, learner ratings may be administered quickly, fairly and accurately, even when assessment ratings are initially unknown or inaccurate. Further, the assessment ratings may quickly be adjusted to accurate values, as well. Such results are achieved without requiring the earlier learners to re-take the assessment, or to take any additional actions to receive updated ratings.

In general, in the two-pass approach just referenced, assessment rating convergences (such as those described and illustrated below with respect to FIG. 4) may be associated with varying convergence times. For example, some assessments (or types of assessments) may take longer to converge.

For example, there may be fewer learners are taking such assessments, or due to high variability in the pass/fail outcomes of learners taking such assessments, or combinations thereof. In particular, the first group of learners taking an assessment or course will often not be sufficient for the assessment rating to reach a stable estimate.

Therefore, it may be desirable to update assessment ratings as more learners take the assessments, in order to reach stable scores. Such update(s) may be executed either by repeating or incrementally updating the first pass of the two-pass system described above.

By updating the first pass outcomes in this manner, a new set of assessment ratings may be determined, in which stable/converged assessment ratings will be approximately the same, but new or not previously converged assessments will have substantially different ratings. Then, the second pass may be repeated to fully update the learner ratings. In these contexts, for example, the second pass is effectively incrementally adding learners' latest online attempts at the relevant assessments.

In some implementations, offline incremental updates to the assessment scores may be executed at a selected, convenient frequency, e.g., daily or weekly, or less frequently, as desired and appropriate to the scale of the system in question. In such contexts, a latest version of the assessment ratings may be used to determine and update learner ratings online.

FIG. 3 is a table illustrating example skill data, such as may be stored using the skill data 110 and/or the skill tagging data 112. In FIG. 3, as referenced above with respect to FIG. 1, the MOOC platform 104 may include a framework for automatically tagging skills to courses. For example, based on Wikipedia's hierarchy of topics and human curation, a hierarchy of more than 40,000 skills may be developed and tagged to courses in the MOOC platform catalog.

Examples of these skills are listed in table 302 of FIG. 3. Skills may have a set of subskills within a skill hierarchy. Individual skills may be tagged to courses, for example, based on a combination of crowd-sourcing and machine learning. Learners who complete a course are asked to report what skills they learned. This information is used as the target variable of a machine-learning model, which estimates the likelihood of tagging based on course content features. The actual tag rate and machine learning prediction are combined to create a single relevance score, giving results for both popular courses and unpopular courses with few crowd-sourced tags being required.

For broad skills of interest, a skill may be treated as tagged to a course if any of the sub skills of that skill within the course's subject area (e.g., data science) are tagged to the course. Many courses are tagged with more than one skill.

Referring back to FIG. 1, the attempt handler 126 may be configured to define an assessment attempt as a learner submission to the MOOC platform 104, which meets certain qualifications. On the MOOC platform 104, assessments include exams with multiple-choice or text answers, programming assignments that require submitting code, and peer review assignments that are graded by other learners. Most, but not necessarily all, are graded. Learners are typically able to retake assessments up to a maximum number of attempts per day.

Learners may retake an assessment for many reasons, from trying again to technical issues. These repeated attempts are often uninformative. For this reason, the attempt handler 126 may filter learner attempts to include only those that are either the first attempt, or a later attempt that does not have the same pass/fail outcome. Thus, most learner-assessment interactions are of the form pass (with no further attempts), fail (with no further attempts), or fail followed by pass at a later time. This approach has the secondary benefit that if the skill scores are surfaced to learners in the future, there is no longer a motive for the learner to repeatedly submit a passed assessment in order to game the system to get a higher score. In some implementations, the attempt handler may also remove all attempts at assessments that all learners pass on the first attempt, since these assessments are not informative.

Referring to the rating algorithm 130 of FIG. 1, as referenced, variations or modified versions of the Glicko scoring system may be included or utilized. For example, the Glicko system assumes that chess players encounter each other during a tournament, during which individual scores can be assumed to be roughly constant. This is the "rating period" over which matches are accumulated, and after which an update to the scores is made.

In contrast, however, in the system of FIG. 1, learner ratings may change rapidly for learners who are learning within a course. For example, studies show that learners may watch course lectures or review supplementary material about 40% of the time between subsequent submissions. Therefore, a rating period may be used that is only one "match" long; e.g., one assessment attempt.

Thus, for example, update equations for the Glicko system may be modified to the example of Equations 1 and 2, e.g., reduced to, for a single match:

$$\mu' = \mu + \frac{1}{1/\sigma^2 + 1/\delta^2} g(\sigma_o^2)\{s - E(s\backslash\mu, \mu_o, \sigma_o^2)\} \quad (1)$$

$$\sigma'^2 = \left(\frac{1}{\sigma^2} + \frac{1}{\delta^2}\right)^{-1} \quad (2)$$

Where $$g(\sigma^2) = \frac{1}{\sqrt{1 + 3\sigma^2/\pi^2}}$$

$$E(s\backslash\mu, \mu_o, \sigma_o^2) = \frac{1}{1 + \exp\left[-g(\sigma_o)(\mu - \mu_o)\right]}$$

$$\delta^2 = \left[g(\sigma_o^2)^2 E(s\mid\mu, \mu_o, \sigma_o^2)\{1 - E(s\backslash\mu, \mu_o, \sigma_o^2)\}\right]^{-1}$$

In these expressions, $\mu$ is the initial score, $\mu'$ is the updated score, $\sigma$ is the initial uncertainty in terms of standard deviation, and $\sigma'$ is the updated uncertainty. The values with a subscript 'o' are those for the opponent. If the "player" is a learner, then the opponent is an assessment (and vice versa). Further, 's' is the outcome of the match. For a learner, passing the assessment is a 'win', and s=1, and failing is a loss with s=0. The reverse is true for assessments.

This Glicko-based version of the rating algorithm 130 may be used to implement the multi-pass approach of FIG. 2. For example, the rating algorithm 130 may assign (and utilize) both a rating and an uncertainty value for that rating, for both learner and assessment ratings. For example, the uncertainty may be expressed as a number using the same scale as the ratings. Thus, for a ratings scale of 1-100, a learner might have a rating of 50, with an uncertainty of +/−5.

Using this approach, to obtain high-quality rating scores for all learners using the multi-pass approach of FIG. 2, the rating algorithm 130 may be executed two or more times. For example, in an initial run, both learners and assessments may be set to have prior rating scores of 0 and uncertainties of 5. Assigning relatively large uncertainties enables correspondingly large updates initially, and also prevents assessments with well-established scores, if any, to avoid experiencing large perturbations from new learners.

In this way, as referenced above with respect to FIG. 2, good estimates of assessment ratings may be obtained, but implies that learners who took the same assessment early in the data, rather than late, will have been matched up against assessments whose scores may be far from reasonable values, especially for less popular content. Further, a learner who has completed the same course, but early in the data, may not have the same score as a learner who performed in exactly the same way in the same course near the end.

Thus, all learner ratings may be reported based on the rating algorithm a second time, using the assessment rating scores and uncertainties from the first run. In the second run, values for assessments may be held fixed. The assessment rating scores for each skill can be offset so that the fifth percentile assessment has a score of zero. Learners can start with prior scores of zero and prior uncertainty of 1.0, which avoids excessive initial swings in score.

It is possible to construct a learner prior score based on information provided by learners (e.g., education history) and what course is being started. However, this could also lead to gaming of the system (by providing false information or trying a hard course first to obtain a better score), and may be biased against learners with nontraditional backgrounds, and introduce additional complexity.

Figure 4:
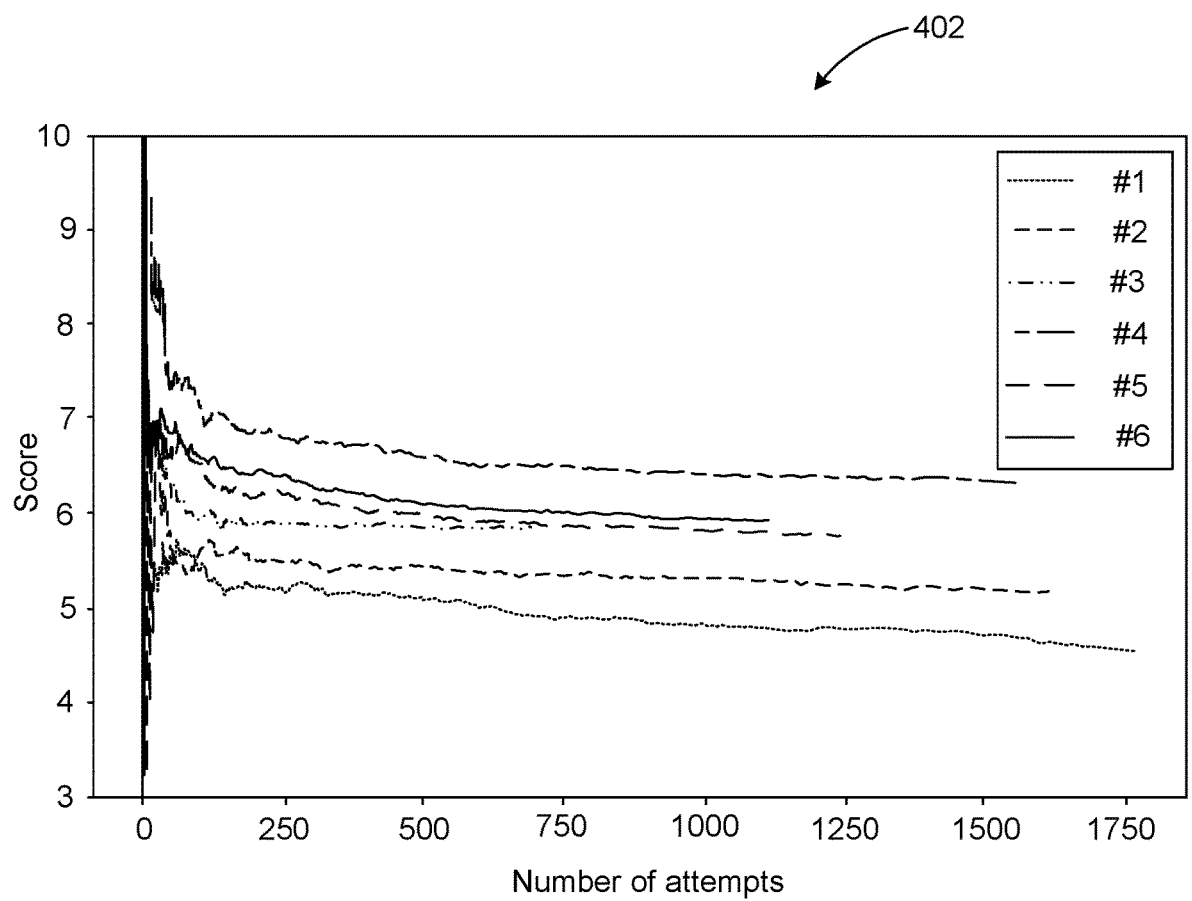
FIG. 4 is a graph illustrating convergence results for example assessments in a course.

FIG. 4 is a graph illustrating convergence results for example assessments in a course. The example illustrated is a Practical Reinforcement Learning course, within the Machine Learning skill. As illustrated, assessments later in the course are typically more challenging, but not always. This reflects variation in difficulty of sub-topics within the course.

Although the assessment ratings clearly converge within the first few hundred attempts, there is also a long-term negative drift in the scores. This is a known occurrence within Elo frameworks. For example, in chess, players generally begin playing as novices and stop playing as masters, with a higher skill than they started. The pressure of new players always starting with low scores leads to ratings deflation over time, and chess tournament rating systems often include corrective factors for this reason. In FIG. 4, a similar effect occurs because learners generally start with lower ratings scores than those of the assessments.

The degree of drift over a few hundred attempts is typically of the same order as the estimated uncertainty (e.g., around 0.2 for the first assessment in the example course). In some implementations, a correction for this drift effect may be added.

Figure 5:
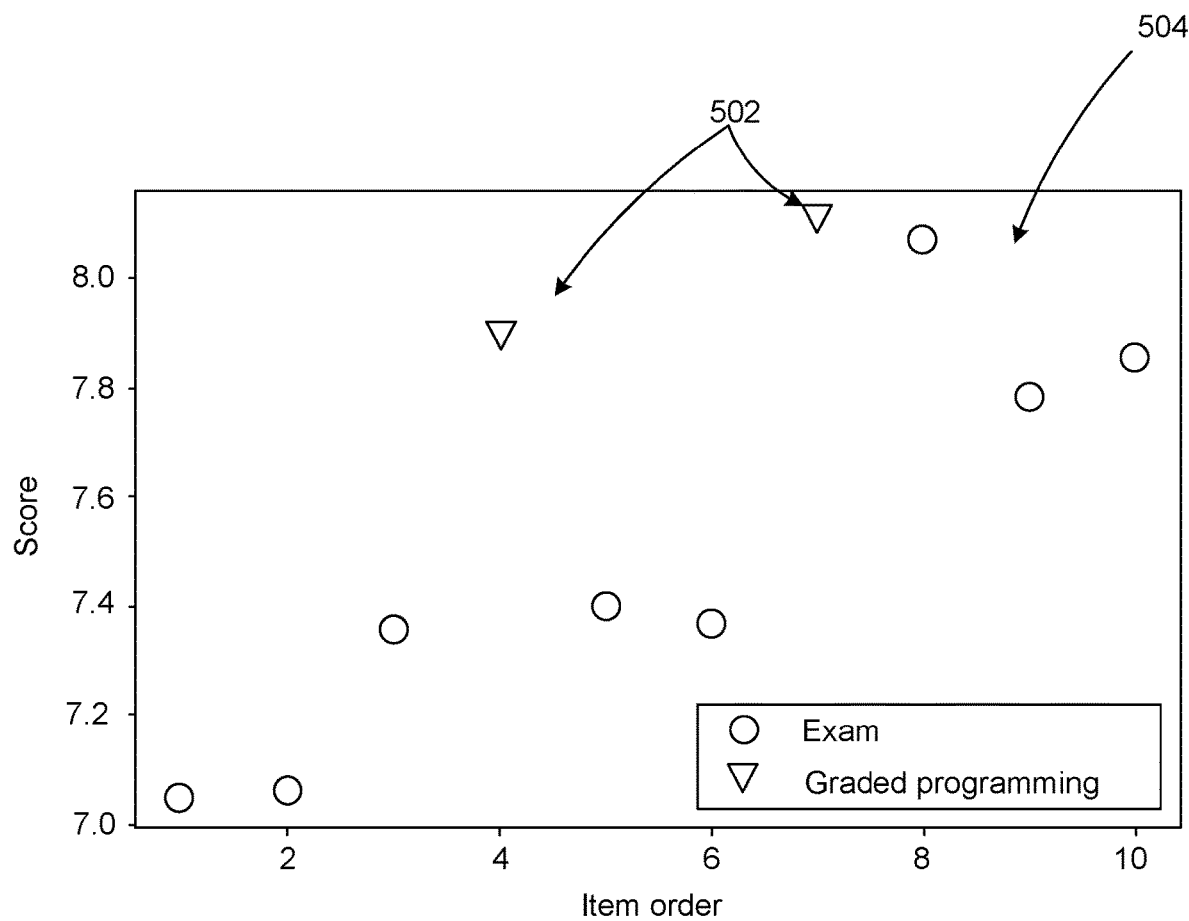
FIG. 5 is a graph illustrating differences between assessment scores based on assessment type.

FIG. 5 is a graph illustrating differences between assessment scores based on assessment type. As shown, for example, assessment rating scores 502 for programming assignments may be higher than assessment scores 504 for regular exams, reflecting that programming assignments may, in general, be more difficult than exams.

Nonetheless, even with such variation and within-topic variability, difficulty may be observed to generally increase from the beginning to the end of a course, as also illustrated in FIG. 5. Across all skills, the mean correlation between assessment order and assessment difficulty within a course has been found to be, e.g., about 0.25.

Figure 6:
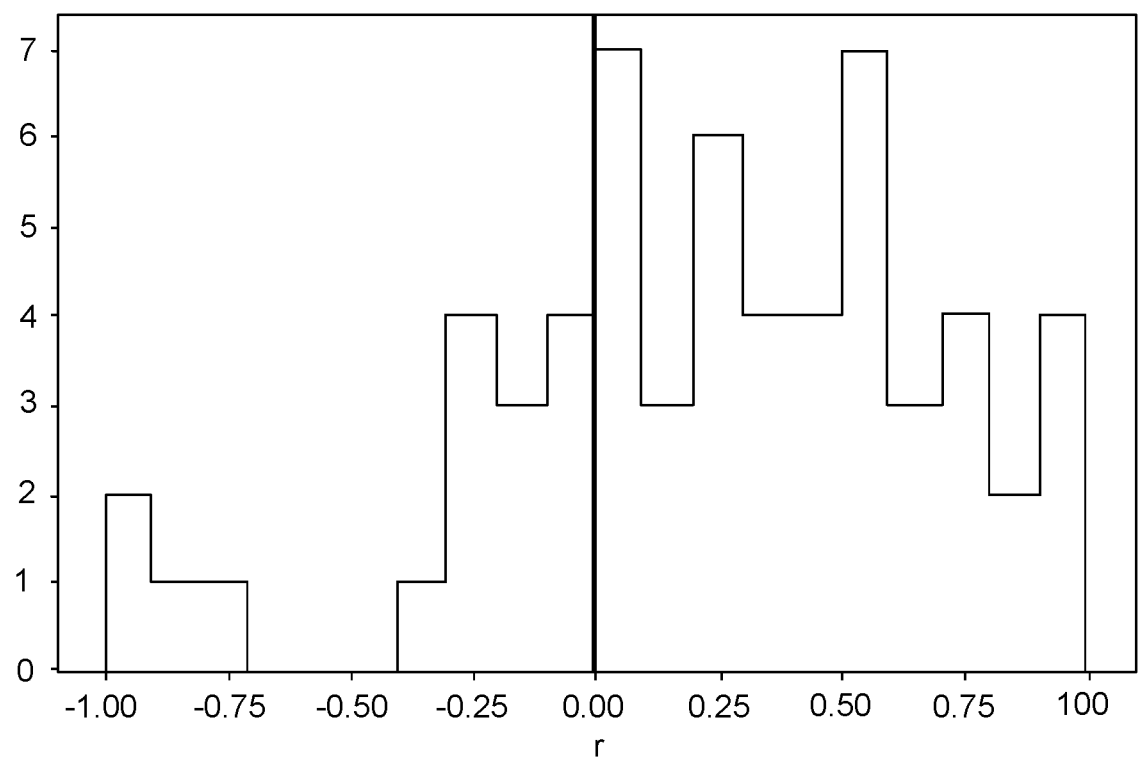
FIG. 6 is a graph illustrating an example distribution of correlations for a single skill between assessment order and assessment difficulty within a course.

The distribution of correlations for a single skill, Machine Learning, is shown in FIG. 6. As may be observed, FIG. 6 is a histogram illustrating a distribution of the correlation between assessment difficulty and assessment order for each course tagged with the Machine Learning skill. Correlation (or lack thereof) may be more extreme for courses having relatively few assessments.

It is also possible to assign and consider ratings across multiple courses, since a single skill may be tagged to multiple courses. For example, based on median assessment score within the Machine Learning skill, the "ANONYMIZED Fundamentals" course is the easiest. This is the first course in a sequence of courses which are intended to be introductory. Conversely, the hardest course is "ANONYMIZED", the final course in a series of advanced Machine Learning courses.

Figure 7:
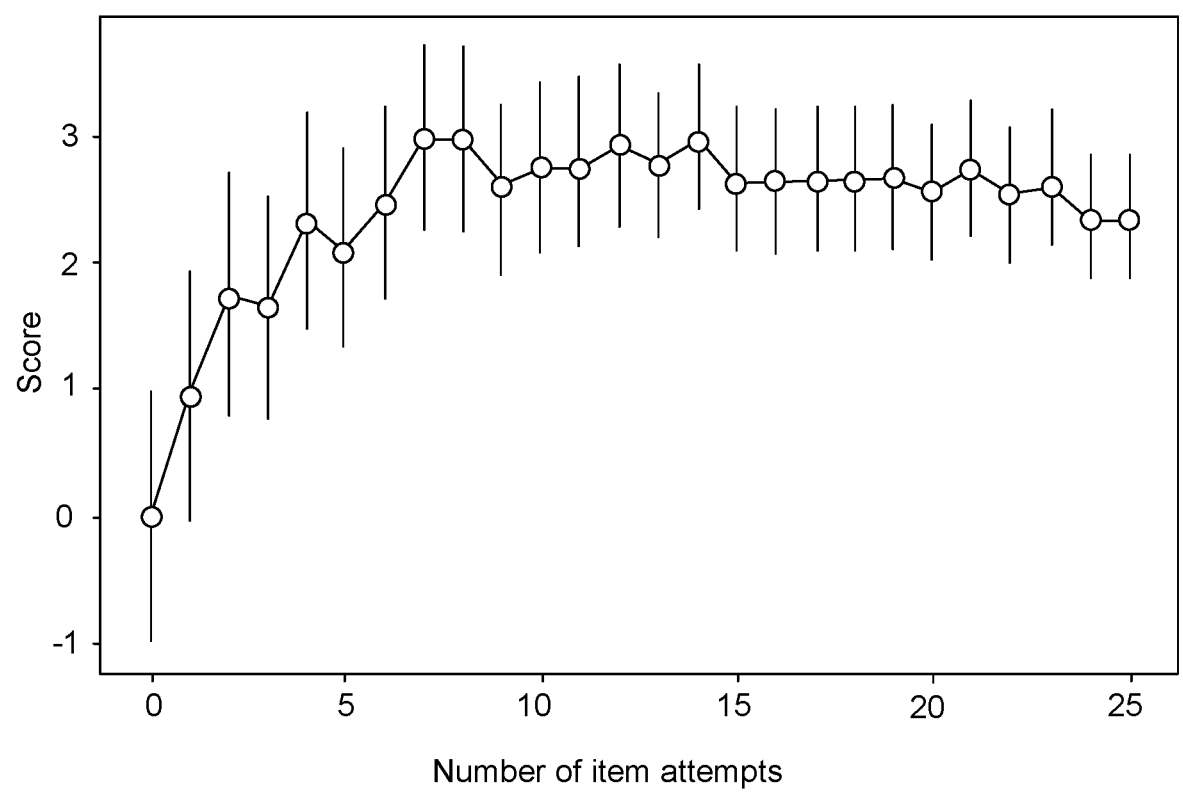
FIG. 7 is a graph illustrating an example of a learner gaining the Machine Learning skill.

FIG. 7 is a graph illustrating an example of a learner gaining the Machine Learning skill. The learner rapidly increases in score to match the initial difficulty of the course, followed by more incremental increases later on. Illustrated drops in score correspond to the learner failing a particular assessment. The example of FIG. 7 is fairly typical of learners moving through a single course, and demonstrates that the rating techniques described herein are accurate, representative, and useful.

Figure 8:
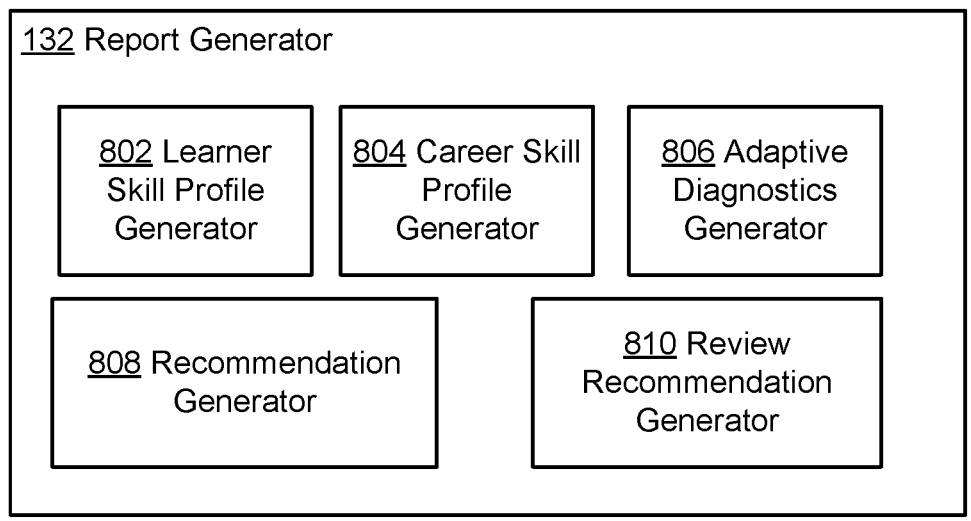
FIG. 8 is a block diagram illustrating a more detailed example of the report generator of FIG. 1.

FIG. 8 is a block diagram illustrating a more detailed example of the report generator 132 of FIG. 1. In FIG. 8, the report generator 132 may include the various illustrated modules 802-810, which illustrate that the assessment and learner ratings obtained herein, in combination with the skills tagging framework 112, unlocks many applications.

For example, a learner skill profile generator 802 enable reports summarizing each learner's measured abilities. Providing this information to learners enable them to better understand their own skills and how much they have learned so far. These profiles would update online to immediately reflect recently submitted assessments.

A career skill profile generator 804 is also illustrated. In contrast to a learner skill profile, a career skill profile shows the skills important to a career and the necessary degree of proficiency. These profiles can be built based on the skills of learners on the MOOC platform 104 who are already in these careers. Then these profiles can be compared against a learner profile, to allow the learner to see what they still need to enter their desired career.

An adaptive diagnostics generator 806 is also illustrated. With difficulty scores for course assessments, it is possible to extract questions from course content and use these questions as the question bank for an adaptive diagnostic. In this way, it is possible to provide questions that are close to a test taker's estimated skill. If learners take diagnostics as a pre-test, before taking any courses, this can support the recommendations by difficulty discussed below.

Specifically, a recommendation generator 808 may generate recommendation based on relevant difficulty levels. For example, given knowledge of a learner's current and desired ability in a skill, it is possible to recommend courses that teach that skill, and which are at the right level for that individual.

Finally in the example of FIG. 8, a review recommendations generator 810 may be configured to provide a recommendation to a learner to review particular portions of courses in which the learner may be struggling. For example, a recommendation to review may find lectures or reading, potentially in another course entirely, which teach the same skill at an easier difficulty level.

Figure 9:
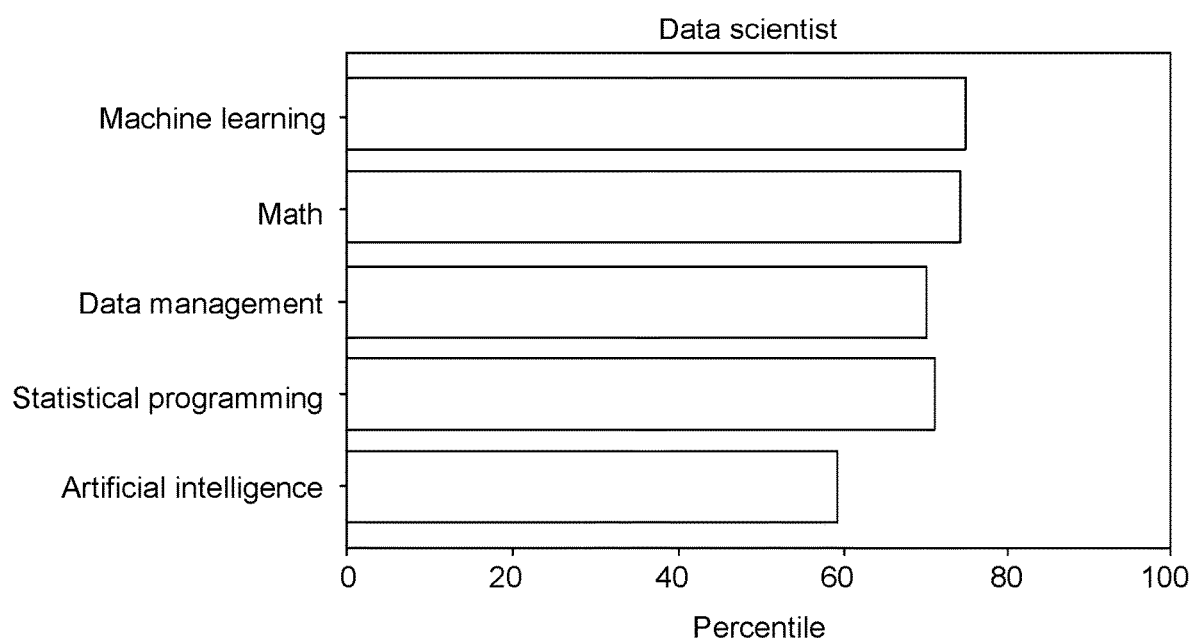
FIG. 9 is a graph illustrating an example of a career skill profile for a Data Scientist.

FIG. 9 is a graph illustrating an example of a career skill profile for a Data Scientist, in accordance with the career skill profile generator 804 of FIG. 8. As shown, more fundamental skills for the career (e.g., Machine Learning) are required at a higher relative skill than the more niche skill of Artificial Intelligence.

Many variations of the techniques described herein are feasible. For example, it is optional whether to include or omit the addition of uncertainty for time passed since the last scoring update. That is, in the original Glicko model, this incorporates how a player's skills may have increased due to practice, or decayed due to lack of use, over time. Such drift may be added merely as a function of time, or based on other factors. For example, additional uncertainty may be added for learners who have spent a significant time perusing course material, or who have spent a long period away from course content.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

store an assessment rating for an assessment corresponding to a skill in an assessment database, the assessment rating being assigned using a standard rating scale;

administer the assessment to a plurality of learners via a network and using an online learning platform to assign each learner of the plurality of learners a corresponding assessment score that indicates either passing or failing the assessment, wherein the assessment has an assessment type of a plurality of assessment types and the assessment score is determined independently of the standard rating scale and is based on the assessment type;

execute an assessment convergence execution of a rating algorithm at a first time to assign a learner skill rating, using the standard rating scale, to each learner of the plurality of learners with respect to the skill, based on the assessment rating and the corresponding assessment score, and store each learner skill rating in a learner rating database, wherein the rating algorithm defines each assessment administration as a match between the assessment and the corresponding learner that is won by the learner when the assessment score is passing and won by the assessment when the assessment score is failing, and further wherein the assessment convergence execution causes the assessment rating to converge to a converged assessment rating on the standard rating scale while processing the learner skill rating of each learner of the plurality of learners;

execute a learner skill rating correction execution of the rating algorithm at a second time in which each learner skill rating is retrieved from the learner rating database and processed with the converged assessment rating being held fixed on the standard rating scale to thereby assign a corrected learner skill rating to each learner of the plurality of learners with respect to the skill and replace each learner skill rating with a corresponding corrected learner skill rating in the learner rating database and using the standard rating scale;

determine a current learner of the plurality of learners, the current learner having a corresponding corrected learner skill rating that provides a current learner skill rating for the current learner within the learner rating database;

find, within the assessment database, for the current learner and in response to the storing of the current learner skill rating, a second assessment corresponding to the skill and having a second assessment rating assigned using the standard rating scale; and provide the second assessment to the current learner via the network and using the online learning platform to thereby provide an adaptive learning experience for the current learner.

2. The computer program product of claim 1, wherein the instructions, when executed, are further configured to cause the at least one computing device to:

execute the rating algorithm including assigning an uncertainty to each learner skill rating and each assessment rating.

3. The computer program product of claim 1, wherein the rating algorithm is a version of the Glicko rating algorithm.

4. The computer program product of claim 3, wherein the instructions, when executed, are further configured to cause the at least one computing device to:

define the match for each learner and assessment as a single administration of the assessment to the learner.

5. The computer program product of claim 1, wherein the instructions, when executed, are further configured to cause the at least one computing device to:
administer, at a third time between the first time and the second time, the assessment to a second plurality of learners using the online learning platform to assign each learner of the second plurality of learners a corresponding assessment score; and
execute the learner skill rating correction execution of the rating algorithm including the plurality of learners and the second plurality of learners.

6. The computer program product of claim 1, wherein the assessment is associated with a course, and the skill is stored in conjunction with the course.

7. The computer program product of claim 1, wherein the instructions, when executed, are further configured to cause the at least one computing device to:
provide each corrected learner skill rating to each corresponding learner of the plurality of learners.

8. The computer program product of claim 1, wherein the instructions, when executed, are further configured to cause the at least one computing device to:
extract questions from course content to form a question bank for an adaptive diagnostic assessment for a learner, based on the converged assessment rating.

9. A computer-implemented method, the method comprising:
store an assessment rating for an assessment corresponding to a skill in an assessment database, the assessment rating being assigned using a standard rating scale;
administering the assessment to a plurality of learners via a network and using an online learning platform to assign each learner of the plurality of learners a corresponding assessment score that indicates either passing or failing the assessment, wherein the assessment has an assessment type of a plurality of assessment types and the assessment score is determined independently of the standard rating scale and is based on the assessment type;
executing an assessment convergence execution of a rating algorithm at a first time to assign a learner skill rating, using the standard rating scale, to each learner of the plurality of learners with respect to the skill, based on the assessment rating and the corresponding assessment score, and store each learner skill rating in a learner rating database, wherein the rating algorithm defines each assessment administration as a match between the assessment and the corresponding learner that is won by the learner when the assessment score is passing and won by the assessment when the assessment score is failing, and further wherein the assessment convergence execution causes the assessment rating to converge to a converged assessment rating on the standard rating scale while processing the learner skill rating of each learner of the plurality of learners;
executing a learner skill rating correction execution of the rating algorithm at a second time in which each learner skill rating is retrieved from the learner rating database and processed with the converged assessment rating being held fixed on the standard rating scale to thereby assign a corrected learner skill rating to each learner of the plurality of learners with respect to the skill and replace each learner skill rating with a corresponding corrected learner skill rating in the learner rating database and using the standard rating scale;
determine a current learner of the plurality of learners, the current learner having a corresponding corrected learner skill rating that provides a current learner skill rating for the current learner within the learner rating database;
find, within the assessment database, for the current learner and in response to the storing of the current learner skill rating, a second assessment corresponding to the skill and having a second assessment rating assigned using the standard rating scale; and
provide the second assessment to the current learner via the network and using the online learning platform to thereby provide an adaptive learning experience for the current learner.

10. The method of claim 9, further comprising:
executing the rating algorithm including assigning an uncertainty to each learner skill rating and each assessment rating.

11. The method of claim 9, wherein the rating algorithm is a version of the Glicko rating algorithm.

12. The method of claim 11, further comprising:
defining the match for each learner and assessment as a single administration of the assessment to the learner.

13. The method of claim 9, further comprising:
administering, at a third time between the first time and the second time, the assessment to a second plurality of learners using the online learning platform to assign each learner of the second plurality of learners a corresponding assessment score; and
executing the learner skill rating correction execution of the rating algorithm including the plurality of learners and the second plurality of learners.

14. The method of claim 9, wherein the assessment is associated with a course, and the skill is stored in conjunction with the course.

15. The method of claim 9, further comprising:
providing each corrected learner skill rating to each corresponding learner of the plurality of learners.

16. The method of claim 9, further comprising:
extracting questions from course content to form a question bank for an adaptive diagnostic assessment for a learner, based on the converged assessment rating.

17. A system comprising:
at least one memory including instructions; and
at least one processor that is operably coupled to the at least one memory and that is arranged and configured to execute the instructions and thereby cause the at least one processor to
store an assessment rating for an assessment corresponding to a skill in an assessment database, the assessment rating being assigned using a standard rating scale;
administer the assessment to a plurality of learners via a network and using an online learning platform to assign each learner of the plurality of learners a corresponding assessment score that indicates either passing or failing the assessment, wherein the assessment has an assessment type of a plurality of assessment types and the assessment score is determined independently of the standard rating scale and is based on the assessment type;
execute an assessment convergence execution of a rating algorithm at a first time to assign a learner skill rating, using the standard rating scale, to each learner of the plurality of learners with respect to the skill, based on the assessment rating and the corresponding assessment score, and store each learner skill rating in a learner rating database, wherein the rating algorithm defines each assessment administration as a match between the assessment and the corresponding learner that is won by the learner when the assessment score is passing and won by the assessment when the assessment score is failing, and further wherein the assessment convergence execution causes the assessment rating to converge to a converged assessment rating on the standard rating scale while processing the learner skill rating of each learner of the plurality of learners;

execute a learner skill rating correction execution of the rating algorithm at a second time in which each learner skill rating is retrieved from the learner rating database and processed with the converged assessment rating being held fixed on the standard rating scale to thereby assign a corrected learner skill rating to each learner of the plurality of learners with respect to the skill and replace each learner skill rating with a corresponding corrected learner skill rating in the learner rating database and using the standard rating scale;

determine a current learner of the plurality of learners, the current learner having a corresponding corrected learner skill rating that provides a current learner skill rating for the current learner within the learner rating database;

find, within the assessment database, for the current learner and in response to the storing of the current learner skill rating, a second assessment corresponding to the skill and having a second assessment rating assigned using the standard rating scale; and provide the second assessment to the current learner via the network and using the online learning platform to thereby provide an adaptive learning experience for the current learner.

18. The system of claim 17, wherein the instructions, when executed, further cause the at least one processor to execute the rating algorithm including assigning an uncertainty to each learner skill rating and each assessment rating.

19. The system of claim 17, wherein the rating algorithm is a version of the Glicko rating algorithm.

20. The system of claim 19, wherein the instructions, when executed, further cause the at least one processor to:

define the match for each learner and assessment as a single administration of the assessment to the learner.

* * * * *